United States Patent [19]

Yaacoub

[11] Patent Number: 5,246,798

[45] Date of Patent: Sep. 21, 1993

[54] LEAD AND SULPHURIC ACID ACCUMULATOR, SEPARATOR FOR A LEAD/SULPHURIC ACID ACCUMULATOR AND PROCESS TO REDUCE THE FORMATION OF DARK DEPOSITS IN A LEAD/SULPHURIC ACID ACCUMULATOR

[75] Inventor: Claudia M. Yaacoub, Quickborn, Fed. Rep. of Germany

[73] Assignee: Grace GmbH, Fed. Rep. of Germany

[21] Appl. No.: 842,786

[22] Filed: Feb. 26, 1992

Related U.S. Application Data

[63] Continuation of Ser. No. 545,261, Jun. 28, 1990, abandoned.

[30] Foreign Application Priority Data

Jun. 6, 1989 [DE] Fed. Rep. of Germany ....... 3922160

[51] Int. Cl.$^5$ ............................................. H01M 2/16
[52] U.S. Cl. .................................... 429/249; 429/250
[58] Field of Search ................................ 429/249, 250

[56] References Cited

U.S. PATENT DOCUMENTS 3,351,495 11/1967 Larsen et al. ...................... 136/146
3,967,978 7/1976 Honda et al. ........................ 429/250
4,024,323 5/1977 Versteegh ............................ 429/249
4,210,709 7/1980 Doi et al. ............................ 429/250
4,216,281 8/1980 O'Rell et al. ........................ 429/250

FOREIGN PATENT DOCUMENTS 0096371 12/1983 European Pat. Off. .
1044028 9/1966 United Kingdom .
2167600 5/1986 United Kingdom .
2169129 7/1986 United Kingdom .

Primary Examiner—Jacqueline V. Howard
Assistant Examiner—M. Nuzzolillo
Attorney, Agent, or Firm—John Dana Hubbard; William L. Baker

[57] ABSTRACT

A lead/accumulator with at least one separator made from filled microporous polyolefins is described, in which the formation of colored, mostly dark and often adhesive deposits occurring in practice is reduced in quantity. This is achieved by the fact that in the accumulator, there are present one or more non-ionic surfactants of a specific structure, the HLB value of which amounts to at least 5. In addition a separator made from filled microporous polyolefins is described, which contains one or more of these surfactants.

18 Claims, No Drawings

LEAD AND SULPHURIC ACID ACCUMULATOR, SEPARATOR FOR A LEAD/SULPHURIC ACID ACCUMULATOR AND PROCESS TO REDUCE THE FORMATION OF DARK DEPOSITS IN A LEAD/SULPHURIC ACID ACCUMULATOR

This is a continuation of co-pending application Ser. No. 07/545,261 filed on Jun. 28, 1990, which is now abandoned.

BACKGROUND OF THE INVENTION

Lead/sulphuric acid accumulators (in the following referred to by the shorter term lead accumulator) contain to an ever increasing extent separators made from filled microporous polyolefins. These separators are microporous separators, the composition and manufacture of which is known from prior art (see example, DE-PS 1 267 423, DE-PS 1 298 712, DE-AS 1 496 123, DE-OS 35 45 615, DE-PS 35 40 718 and DE-PS 36 17 318).

In contrast to separators based on impregnated cellulosic paper, PVC or phenol-formaldehyde-resins, separators made from filled polyolefins offer various advantages. On the one hand by their favorable property characteristics separators made from filled polyolefins, for example, have a very low electrical resistance, very small pores, a low acid displacement and a high oxidation stability, the life duration and capacity of lead accumulators can be improved, and on the other hand there are also advantages in the manufacture of the accumulator. The high flexibility of the separators made from filled microporous polyolefins allows fully automatic enveloping of lead plates and final sealing of the side edges, with the result that the lead plates are protected in a separator pocket, closed on three sides.

However, in the use of separators made from filled polyolefins in lead accumulators undesired processes are also observed.

By the interaction of the applied current, constituents of the lead plates, of the battery acid and constituents of the filled polyolefin separators, intensely coloured substances mixtures are formed, which are not soluble in the battery acid. As a result of their low specific weight they rise to the surface of the battery acid and there cluster together to form intensely coloured, mostly dark and often adhesive agglomerates, which tend to be deposited on the contact surfaces between the accumulator acid and the accumulator constituents, for example on the housing. In the charging process, gases, which are released, rise as bubbles in the acid, bursting on the surface of the acid and thereby throwing acid and deposits upwards, which results in the lid, the lid opening, the lid closure possibly placed on it, and also possibly the level indicator and the outside of the accumulator housing being the covered with the deposits.

Deposits on the outside of the accumulator housing must be removed by an additional cleaning stage.

Housing for lead accumulators consist, for example, of polypropylene acrylic, polystyrene or glass and are therefore transparent or totally clear. When in use coloured, mostly dark deposits arising in the lead accumulator deposit themselves on the inside of the containers and are therefore visible from the outside. As the deposits themselves are not transparent, an exact assessment of the acid condition is prevented, thereby making the regular inspection and adjustment of the acid condition more difficult. Therefore, if enough water is not added, the concentration of the accumulator acid increases. At the same time the acid level in the accumulator can possibly sink so far, that the lead plates partly protrude out of the acid and dry out. Lead accumulators which for example are used for motor vehicles, are often fitted with a valve system for automatic water-addition. These lead accumulators are regularly attached to a water reserve tank via the valve system. In proper working order the valve system ensures that a certain level of liquid is maintained in the lead accumulator. However, if this type of lead accumulator contains separators made of filled polyolefins, then as described above, during the use of this lead accumulator, coloured, mostly dark substances are released which agglomerate. These often adhesive agglomerates deposit themselves on the floats and other parts of the valve system for water addition, sticking these together and making them incapable of functioning. Consequently no water is added, and the acid level in the accumulator decreases seriously.

Many lead accumulators are fitted with gassing openings made from porous materials, which facilitate an unhindered escape of the gases formed, but which however hold back liquid constituents and protect the accumulator from sparks or flames. If this type of lead accumulator contains the filled polyolefin accumulators described above, when the lead accumulator is in use, as described, there arises a formation of coloured, mostly dark and often adhesive deposits, which reduce the size of the degassing openings.

OBJECT AND SUMMARY OF THE INVENTION

In view of the problem described above the basis of the objective of the invention is to reduce the quantity of coloured, mostly dark and often adhesive deposits formed in lead accumulators with microporous separators made from filled polyolefins, during the formation and the use.

DETAILED DESCRIPTION OF THE INVENTION

To achieve this objective a lead/sulphuric acid accumulator with at least one separator made from filled polyolefins, in which the separator is manufactured by hot-moulding followed by extraction, is proposed, which is characterized in that one or more surfactants of the following formula are present in the accumulator:

$$R-O-R_3 \text{ and} \qquad (III)$$

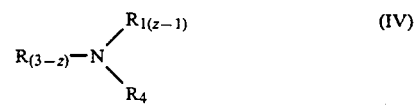

where R is a branched or straight-chain, substituted or non-substituted alkyl-, alkenyl- or alkynyl radical with 6 to 50 carbon atoms, $R_1$ is hydrogen, an oxalkyl or an alkyl radical, $R_2$ is an oxalkyl radical if $R_1$ is hydrogen or an oxalkyl radical, or an alkyl radical if $R_1$ is an alkyl radical, $R_3$ is an oxalkyl-, glycerinoxalkyl- or a sorbitanoxalkyl radical and $R_4$ is an oxalkyl radical when $z=1$ and otherwise corresponds to the definition of $R_2$, $z=1$ or 2, the oxalkylation degree, provided that oxalkyl radicals are present, amounts in total to 2 to 80 and the hydrophilic-lipophilic balance value amounts to at least 5.

In addition, the subject of the invention is a separator for lead/sulphuric acid accumulators, made from filled polyolefin, which is manufactured by hot-moulding followed by extraction and is characterized in that it contains one or more of the surfactants of the formulae I to IV.

Finally, the subject of the invention is a process for reducing the formation of coloured, mostly dark deposits in a lead/sulphuric acid accumulator, in particular in a starter-battery, with at least one separator made from filled polyolefins, where the separator is manufactured by hot-moulding followed by extraction, which is characterized in that one or more of the surfactants of formulae I to IV are introduced in the accumulator.

Surprisingly it was found, that the addition of the surfactants used according to the invention reduced the quantity of coloured, mostly dark deposits in the accumulator, and this was achieved with longer effective duration and without undesired secondary phenomenon. At the same time a reduction of the water used in the accumulator is observed, which presents a further considerable advantage.

Apart from the addition of the surfactants used according to the invention, the accumulator according to the invention relates to an ordinary lead/sulphuric acid accumulator with conventional electrodes and sulphuric acid as electrolyte. Preferably it relates to a starter battery for motor vehicles. The housing can consist of all the usual materials, for example polypropylene, hard rubber, acrylic, polystyrene, glass etc. The separators are made from filled polyolefins, which are manufactured by hot-moulding (usually extrusion or pressing, see examples) followed by extraction. Accordingly, separators manufactured from non-microporous polyolefin threads or fibers (e.g. in the form of mats) (see e.g. U.S. Pat. No. 4,216,281) are not included in the invention.

By extraction, a partial or complete removal of one or more components from the moulded material and also the additional introduction of the same or different components in the moulded material with the help of suitable solvents is understood, where these components can be a plasticizer in particular, but can also be fillers, polymers etc. U.S. Pat. No. 3,351,495 describes such a product and process for making it and is herein incorporated by reference.

As already described in the prior art mentioned above, filled polyolefin separators mainly contain polyethylene, where within the framework of the invention polyethylene of ultra-high molecular weight is preferred. However, polypropylene, polybutene, polystyrene, ethylene-propylene co-polymers, ethylene-hexylene co-polymers, ethylene-butene co-polymers, propylene-butene copolymers, ethylene-propylene-butene co-polymers, and co-polymers of ethylene or propylene with an ethylene unsaturated mono-carbonic acid, such as acrylic acid, methacrylic acid or mixtures of these are suitable. The prior art mentioned at the beginning can also be referred to with regard to fillers. A preferred filler according to the invention is $SiO_2$ Silica. The suitable plasticizers are also known from the prior art. In practice oils are often used as extractable plasticizers.

Apart from the main constituents mentioned previously the separators can also contain further usual constituents such as carbon black, antioxidants, lubricants, other fillers such as for example talcum etc. and possibly also other polymers in more or less minor quantities.

The materials forming the separators are carefully mixed in the usual manner and the formed, while heating, into a long length of material. In order to achieve the desired porosity, this is then extracted with an organic solvent, to remove one or more of the materials, e.g. the plasticizer. Finally the separator material is cut into the separator sheets. The surfaces of the separators can be flat, ribbed or formed in other arbitrary ways.

As shown from the formulae I to IV, the surfactants used according to the invention are non-ionic surfactants, which consist of a non-polar and a polar part. In the non-polar part these surfactants contain one or two alkyl-, alkenyl- or alkynyl groups. These can be linear or branched and possibly have substituents (e.g. —OH). Preferably, however they are linear and have from 8 to 20 carbon atoms. All molecules of a suitable surfactant can uniformly contain one of these groups with a specific chain length. As in practice surfactants are, to a large extent, produced from non-uniform natural starting materials, they can however easily also contain mixtures of groups with different length chains, i.e. according to which starting material is used, surfactants available commercially have a specific chain-length distribution.

The polar part of the surfactants usable according to the invention consists of a functional group, which is substituted. The functional group can be a carbonic acid, amide-, amine- or alcohol group, which is singly or doubly alkylated or oxalkylated, or a carbonic acid group which is oxalkylated or is first esterified with glycerine or sorbitan and then oxalkylated. The oxalkylation can be carried out with ethylene oxide, propylene oxide or higher alkylene oxides or mixtures of them. Such surfactants are preferred with which the oxalkylation is carried out with mixtures of different alkylene oxides and in particular with pure ethylene oxide. The oxalkylation degree in this is not of extreme importance, however in general it lies in the region of 2 to 80. An oxalkylation degree from 2 to 30 or 5 to 30 is preferred. These details are naturally also valid for those surfactants in which oxalkyl radicals are present.

Independent of the structure, the hydrophilic-lipophilic balance value of the suitable surfactants according to the invention amounts to at least 5 and preferably at least 8.

As described already for the non-polar part, the polar parts of the suitable surfactants according to the invention can also be combined of mixtures. Thus, the individual molecules of the surfactants can be oxalkylated to varying degrees. If two oxalkyl groups are contained in the polar part of the molecule, they can be of different lengths. In addition the oxalkylate can be terminally blocked (e.g. by etherification with methyl alcohol).

If the functional group in the polar part of the surfactant molecule is alkylated, then the alkyl groups are preferably methyl- or ethyl-groups.

The suitable surfactants according to the invention corresponding to the formulae I to IV are known and available commercially. Further detailed explanations of these compounds are therefore not necessary. Examples are among others oleylaminooxethylate, stearylaminooxethylate, tallow fatty aminooxethylate, coconut oil aminooxethylate, coconut oil acid diethanol amidoxethylate, coconut oil acid monoethanol amidoxethylate, dodecanedioic-acid-N,N-diethylamide, fatty alcohol oxethylate such as decylalcohol oxethylate, octylalcohol-oxethylate, coconut oil alcohol oxethylate, tallow fatty alcohol oxethylate, stearyl alcohol oxethylate and oleyl alcohol oxethylate, oleic acid amideoxethylate, fatty acid oxethylate such as tallow fatty acid oxethylate and tall oil fatty acid oxethylate, oxoalcoholoxethylate with 8 to 20 carbon atoms in the alcohol residue, fatty acid glycerinesteroxethylate such as polyoxyethylene glycerine monolaurate, -stearate, oleate or palmitate and castor oil oxethylate as well as fatty acid sorbitan ester oxethylate of the Tween type. These commercial surfactants are available with different oxethylation degrees, where an oxethylation degree from 2 to 30 is particularly common.

It should finally be mentioned that the suitable surfactants according to the invention are often soluble in water and in sulphuric acid.

The method and location of the addition of the surfactants have no decisive influence on the effectiveness of the surfactants. A surfactant can be used alone or in a mixture of two or more suitable surfactants according to the invention. Mixtures of one or more of the suitable surfactants according to the invention with other interface active materials, defoamers etc. can also be used.

The surfactants can be applied on the surfaces of the separators. They can be applied on the side turned towards the negative electrode, on the side turned towards the positive electrode or on both sides of the separator. In all three cases when the same quantity of surfactants is used, the same reduction in the quantity of dark deposits can be observed.

Another possibility is mixing the suitable surfactants according to the invention in the mixture for the production of filled polyolefin separators. This can, using different steps, result in the manufacture of the separator. For example the surfactants can be mixed together with the further raw materials for the manufacture of the named separator. The sequence of mixing together the components is in this without influence, and the mixture is then formed into a sheet and extracted. All the raw materials can also be mixed together first and extruded. The extrudate is then mixed with the surfactants, formed into a sheet and extracted. Adding the surfactants by a measuring unit to the other raw materials already charged in the extruder is also possible, if the formation of the sheet is carried out by extrusion.

Further possibilities for the introduction of suitable surfactants according to the invention are the application on the electrode or mixing in the active substances. Finally the surfactants can also be put into the accumulator electrolyte, for example before this is filled into the accumulator or afterwards in the finished accumulator.

The surfactant concentrations to be used should, in reference to the accumulator electrolyte, be greater than 0.03 g/l, preferably greater than 0.08 g/l and in particular greater than 0.16 g/l. in reference to the separator surface the surfactant concentration should be greater than 0.1 g/m$^2$, preferably greater than 0.25 g/m$^2$ and in particular greater than 0.5 g/m$^2$.

Although in the prior art in the manufacture of accumulators or the manufacture of separators different surfactants including non-ionic surfactants were used or their use was proposed, the use of surfactants of formulae I to IV in lead accumulators with filled poly-olefin separators has not yet been described or recommended. The use of surfactants and in particular non-ionic surfactants has also not yet been proposed in connection with the formation of coloured, mostly dark and often adhesive deposits observed in the use of filled polyolefin separators. In view of the seriousness of the problem of the formation of this type of deposit, the so-called black or grey scum, and the vast multitude of used or proposed surfactants, this is extremely surprising and shows that the world of experts obviously saw no possibility of solving the black scum problem by the use of surfactants.

The effectiveness of the surfactants used according to the invention is shown in the following by the examples. To evaluate the effectiveness accumulator tests were carried out. The sample accumulator used consisted of cells each with five positive and four negative plates, antimony-content of 2.5% by weight, with a total capacity of 36 AH/cell. If not given otherwise, the negative plates were separated with separator pockets of filled polyolefins (total thickness 1.0 mm) and the electrolyte was sulphuric acid to an amount of 400 ml/cell. After carrying out the tests the cells were opened and the quantity and the condition of the dark deposit on the cell boxes, cell lids and stoppers was evaluated by several persons. The average values of these evaluations were then compared with each other.

EXAMPLE 1

Two accumulators as described above were each separated with four separator pockets. One of them was filled with 400 ml of sulphuric acid of a density of 1.16 g/cm$^3$ and the other was filled with 400 ml of a solution of 0.5 g of coconut fatty acid monoethanol amidoxethylate (cloud point approximately 30° C., 1% in a 5% by weight of a NaCl solution) in 1 l of sulphuric acid of a density of 1.16 cm$^3$. Each accumulator was subjected to the same electrical test. Finally the opened accumulators were judged. In the accumulator with the treated sulphuric acid the quantity of coloured deposits amounted to approximately 75% of the deposit in the accumulator with the untreated sulphuric acid.

EXAMPLE 2

A mixture of 61% by weight of a naphthene process oil (plasticizer), 24% by weight of SiO$_2$ (particle size 15 µm), 12% by weight of polyethylene, 1% by weight of carbon black and 2.0% by weight of coconut fatty acid monoethanol amidoxethylate (cloud point approximately 30° C., 1% in 5% by weight of NaCl solution) was prepared, in which all the substances were mixed in a mixer for 10 minutes to obtain a powder-like material and finally plasticized in a Brabender Plastograph at 210° C. Separator sheets 0.25 mm thick were pressed from the hot plastic mass with a heated press, which were then extracted with an organic solvent to a residual oil content of 12%. One accumulator had 8 such separator sheets. A second accumulator had 8 separator sheets which were manufactured in the same way from 62.2% by weight of oil, 24.5% by weight of SiO$_2$, 12.2% by weight of polyethylene and 1.1% by weight of carbon black. Each accumulator was filled with 400 ml of sulphuric acid to a density of 1.16 g/cm$^3$ and each was subjected to the same electrical test. Finally the accumulators were opened and the quantity of dark deposit was judged. In the accumulator, of which the separators contained the incorporated surfactant, the quantity of coloured deposit only amounted to approximately 75% of the deposit in the accumulator with the conventional separators.

EXAMPLE 3

Four separator pockets were coated on both sides with an alcoholic solution of oleic acid amidoxethylate (cloud point approximately 50° C., 1 g in 100 g of 5% by weight of a NaCl solution), with the result that after drying a total amount of 0.5 g remained on each pocket. An accumulator as described above had four of these pockets as separators. A second accumulator had untreated pockets as separators. Both accumulators were filled with sulphuric acid at a density of 1.28 g/cm$^3$ and charged. Finally a water consumption test was carried out for each accumulator according to DIN 43539-02. After the end of the test the accumulators were opened and the quantity of coloured deposits on the cases was evaluated. In the accumulator with the treated separator pockets the quantity of the deposits amounted to approximately 60% of the deposit in the accumulator with the untreated pockets. The water consumption of the accumulators with the treated pockets was 2.3 g/Ah, while that of the accumulator with the untreated pocket was 2.9 g/Ah (14.4 V, +40° C., after 21 days).

EXAMPLE 4

The positive plates of one accumulator were coated with 0.6 g in total of dodecanic acid-N,N-diethyl amide. The plates of a second accumulator were not treated. Both accumulators had untreated separator pockets. Finally both accumulators were filled with sulphuric acid at a density of 1.16 g/cm$^3$ and each was subjected to the same electrical test. After the end of the test the accumulators were opened and the quantity of coloured deposits was evaluated. In comparison to the accumulator with the untreated plates, the quantity of coloured deposits in the accumulator with treated plates amounted to only approximately 60%.

EXAMPLE 5

Stearylaminoxethylate was sprayed on to both sides of five separator pockets (alkali number approximately 90 mg, KOH/g), so that 0.10 g of surfactant remained in total on the pockets. The positive plates of one accumulator as described before were separated with these pockets. The same was done in the second accumulator, but with untreated pockets. Both accumulators were filled with 400 ml of sulphuric acid each at the density of 1.16/cm$^3$ and each was subjected to the same electrical test. Finally the accumulators were opened and the quantity of coloured deposits was evaluated. In the accumulator with the treated separator pockets the quantity of coloured deposit amounted to only approximately 75% of the deposit in the accumulator with the untreated cases.

EXAMPLE 6

Four separator pockets were coated on their smooth sides with an aqueous solution of oleylaminoxethylate (alkali number approximately 115 mg KOH/g), so that after the pockets dried there was 2.5 g/m$^2$ of separator material on them. An accumulator as described before had these four pockets as separators. A second accumulator had four untreated pockets as separators. Both accumulators were filled to a density of 1.16 g/cm$^3$ with 400 ml of sulphuric acid each and each was subjected to the same electrical test. Finally the accumulators were opened and the quantity of coloured deposit was evaluated. In the accumulator with the treated separator cases the quantity of coloured deposit amounted to only approximately 40% of the deposit in the accumulator with the untreated cases.

While the present invention has been described with reference to its preferred embodiments, other embodiments, modifications and equivalents would be obvious to one skilled in the art. It is intended in the appended claims to include all such other embodiments, modifications and equivalents as fall within the true spirit and scope of this invention.

What is claimed is:

1. A lead/sulphuric acid accumulator consisting essentially of an electrolyte, at least one separator made from filled polyolefins, in which the separator has been formed by hot-moulding followed by extraction, at least one positive and one negative plate and one or more water soluble surfactants selected from the group consisting of:

 (I)

 (II)

 (III)

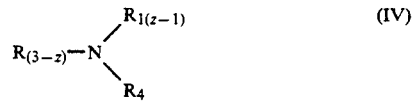 (IV)

where R is a branched or straight-chain, substituted or non-substituted alkyl-, alkenyl-, or alkynyl radical with 6 to 50 carbon atoms, R$_1$ is hydrogen, an oxalkyl radical or an alkyl radical, R$_2$ is an oxalkyl radical if R$_1$ is hydrogen or an oxalkyl radical, or is an alkyl radical if R$_1$ is an alkyl radical, R$_3$ is an oxalkyl-, glycerinoxalkyl-, or sorbitan-oxalkyl radical and R$_4$ is an oxalkyl radical if z=1 and otherwise corresponds to the definition for R$_2$, z is 1 or 2, the oxalkylation degree, provided that oxalkyl radicals are present, amounts in total to 2 to 80 and the hydrophilic-lipophilic balance (HLB) value amounts to at least 5.

2. The accumulator according to claim 1, wherein the separator consists of filled polyethylene, in particular polyethylene of ultra-high molecular weight and is essentially filled with SiO$_2$ and plasticizers.

3. The accumulator according to claim 1, wherein R is linear and has 8 to 20 carbon atoms.

4. The accumulator according to claim 1 wherein the oxalkylation degree of the surfactant is from 2 to 30 and in particular to 5 to 30.

5. The accumulator according to claim 1 wherein the oxalkyl radicals are ethoxy radicals.

6. The accumulator according to claim 1 wherein the HLB value amounts to at least 8.

7. The accumulator according to claim 1 wherein the one or more surfactants are applied to the separator surfaces.

8. The accumulator according to claim 1 wherein the one or more surfactants are added to the electrolyte in amount of at least 0.03 g/l, preferably more than 0.08 g/l and in particular more than 0.16 g/l.

9. The accumulator according to claim 1 wherein the one or more surfactants are applied to the positive electrodes, the negative electrodes or both.

10. The accumulator according to claim 1 wherein the one or more surfactants are added to the separator as it is being formed.

11. A separator for lead/sulphuric acid accumulators consisting essentially of a microporous sheet material formed of a polyolefin, a filler and one or more water soluble surfactants selected from the group consisting of:

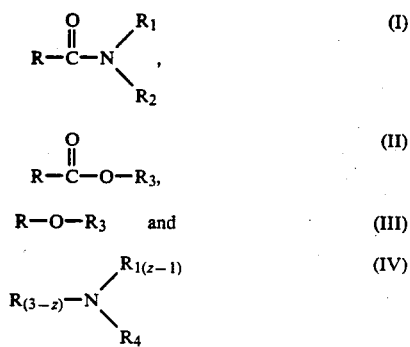

where R is a branched or straight-chain, substituted or non-substituted alkyl-, alkenyl-, or alkynyl radical with 6 to 50 carbon atoms, $R_1$ is hydrogen, an oxalkyl radical or an alkyl radical, $R_2$ is an oxalkyl radical if $R_1$ is hydrogen or an oxalkyl radical, or is an alkyl radical if $R_1$ is an alkyl radical, $R_3$ is an oxalkyl-, glycerinoxalkyl-, or sorbitan-oxalkyl radical and $R_4$ is an oxalkyl radical if $z=1$ and otherwise corresponds to the definition for $R_2$, z is 1 or 2, the oxalkylation degree, provided that oxalkyl radicals are present, amounts in total to 2 to 80 and the hydrophilic-lipophilic balance (HLB) value amounts to at least 5.

12. The separator according to claim 11, wherein the surfactant or surfactant mixture is applied to at least one of the two surfaces of the separator.

13. The separator, according to claim 11, wherein the surfactant or surfactant mixture is incorporated into the separator during its formation.

14. A process for the reduction of the formation of dark deposits in a lead/sulphuric acid accumulator consisting essentially of incorporating into the lead/sulphuric acid accumulator one or more water soluble surfactants selected from the group consisting of:

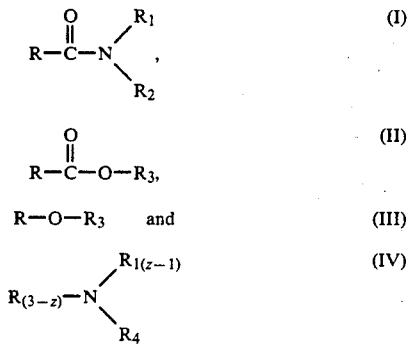

where R is a branched or straight-chain, substituted or non-substituted alkyl-, alkenyl-, or alkynyl radical with 6 to 50 carbon atoms, $R_1$ is hydrogen, an oxalkyl radical or an alkyl radical, $R_2$ is an oxalkyl radical if $R_1$ is hydrogen or an oxalkyl radical, or is an alkyl radical if $R_1$ is an alkyl radical, $R_3$ is an oxalkyl-, glycerinoxalkyl-, or sorbitan-oxalkyl radical and $R_4$ is an oxalkyl radical if $z=1$ and otherwise corresponds to the definition for $R_2$, z is 1 or 2, the oxalkylation degree, provided that oxalkyl radicals are present, amounts in total to 2 to 80 and the hydrophilic-lipophilic balance value amounts to at least 5 in an amount effective to reduce the formation of dark deposits.

15. The accumulator according to claim 1 wherein the one or more surfactants are selected from the group consisting of oleylaminooxethylate, stearylaminooxethylate, tallow fatty aminooxethylate, coconut oil aminooxethylate, coconut oil acid diethanol amidoxethylate, coconut oil acid monoethanol amidoxethylate, dodecanedioic-acid-N, N-diethylamide, fatty alcohol oxethylate selected from the group consisting of decylalcohol oxethylate, octylacohol-oxethylate, coconut oil alcohol oxethylate, tallow fatty alcohol oxethylate, stearyl alcohol oxethylate and oleyl alcohol oxethylate, oleic acid amideoxethylate, fatty acid-oxethylate selected from the group consisting of tallow fatty acid oxethylate and tall oil fatty acid oxethylate, oxoalcoholoxethylate with 8 to 20 carbon atoms in the alcohol residue, fatty acid glycerinesteroxethylate selected from the group consisting of polyoxethylene glycerine monolaurate, stearate, oleate, palmitate; and castor oil oxethylate and fatty acid sorbitan ester oxethylate.

16. The separator according to claim 11 wherein the one or more surfactants are selected from the group consisting of oleylaminooxethylate, stearylaminooxethylate, tallow fatty aminooxethylate, coconut oil aminooxethylate, coconut oil acid diethanol amidoxethylate, coconut oil acid monoethanol amidoxethylate, dodecanedioic-acid-N, N-diethylamide, fatty alcohol oxethylate selected from the group consisting of decylalcohol oxethylate, octylacohol-oxethylate, coconut oil alcohol oxethylate, tallow fatty alcohol oxethylate, stearyl alcohol oxethylate and oleyl alcohol oxethylate oleic acid amideoxethylate, fatty acid oxethylate selected from the group consisting of tallow fatty acid oxethylate and tall oil fatty acid oxethylate, oxoalcoholoxethylate with 8 to 20 carbon atoms in the alcohol residue, fatty acid glycerinesteroxethylate selected from the group consisting of polyoxethylene glycerine monolaurate, stearate, oleate, palmitate; and castor oil oxethylate and fatty acid sorbitan ester oxethylate.

17. The process according to claim 14 wherein the one or more surfactants are selected from the group consisting of oleylaminooxethylate, stearylaminooxethylate, tallow fatty aminooxethylate, coconut oil aminooxethylate, coconut oil acid diethanol amidoxethylate, coconut oil acid monoethanol amidoxethylate, dodecanedioic-acid-N, N-diethylamide, fatty alcohol oxethylate selected from the group consisting of decylalcohol oxethylate, octylacohol-oxethylate, coconut oil alcohol oxethylate, tallow fatty alcohol oxethylate, stearyl alcohol oxethylate and oleyl alcohol oxethylate, oleic acid amideoxethylate, fatty acid oxethylate selected from the group consisting of tallow fatty acid oxethylate and tall oil fatty acid oxethylate, oxoalcoholoxethylate with 8 to 20 carbon atoms in the alcohol residue, fatty acid glycerinesteroxethylate such as polyoxethylene glycerine monolaurate, stearate, oleate, palmitate; castor oil oxethylate and fatty acid sorbitan ester oxethylate.

18. A separator for lead/sulphuric acid accumulators consisting essentially of microporous, extruded sheet material formed of a polyolefin, a filler and one or more water soluble surfactants selected from the group consisting of oleylaminooxethylate, stearylaminooxethylate, tallow fatty aminooxethylate, coconut oil aminooxethylate, coconut oil acid diethanol amidoxethylate, coconut oil acid monoethanol amidoxethylate, dodecanedioic-acid-N, N-diethylamide, fatty alcohol oxethylate selected from the group consisting of decylalcohol oxethylate, octylalcohol-oxethylate, coconut oil alcohol oxethylate, tallow fatty alcohol oxethylate, stearyl alcohol oxethylate and oleyl alcohol oxethylate, oleic acid amideoxethylate, fatty acid oxethylate selected from the group consisting of tallow fatty acid oxethylate and tall oil fatty acid oxethylate, oxoalcoholoxethylate with 8 to 20 carbon atoms in the alcohol residue, fatty acid glycerinesteroxethylate selected from the group consisting of polyoxethylene glycerine monolaurate, stearate, oleate and palmitate; and castor oil oxethylate.

* * * * *